United States Patent
Biggs et al.

(10) Patent No.: US 11,692,852 B2
(45) Date of Patent: Jul. 4, 2023

(54) POSITION SENSOR HAVING SEGMENT SENSOR ELEMENT

(71) Applicant: AVX Electronics Technology Limited, Cambridge (GB)

(72) Inventors: Timothy Biggs, Cambridge (GB); David Witts, Cambridge (GB)

(73) Assignee: KYOCERA AVX COMPONENTS (WERNE) GMBH, Werne (DE)

( * ) Notice: Subject to any disclaimer, the term of this patent is extended or adjusted under 35 U.S.C. 154(b) by 125 days.

(21) Appl. No.: 17/106,728

(22) Filed: Nov. 30, 2020

(65) Prior Publication Data
US 2022/0170763 A1 Jun. 2, 2022

Related U.S. Application Data

(60) Provisional application No. 62/982,983, filed on Feb. 28, 2020.

(51) Int. Cl.
*G01D 5/20* (2006.01)
*H01F 27/28* (2006.01)

(52) U.S. Cl.
CPC .......... *G01D 5/2053* (2013.01); *H01F 27/28* (2013.01)

(58) Field of Classification Search
CPC .. G01D 5/2053; G01D 5/2073; G01D 5/2086; G01D 5/22; G01D 5/2208; G01D 5/2225; G01D 5/225; G01D 5/2275; G01D 5/2283; G01D 5/2291
See application file for complete search history.

(56) References Cited

U.S. PATENT DOCUMENTS

| | | | |
|---|---|---|---|
| 5,886,519 A | 3/1999 | Masreliez et al. | |
| 5,998,990 A * | 12/1999 | Andermo | G01D 5/2086 324/207.17 |
| 6,011,389 A * | 1/2000 | Masreliez | G01D 5/2053 324/207.17 |
| 2013/0033257 A1 | 2/2013 | Sasaki et al. | |
| 2019/0017845 A1 * | 1/2019 | Utermoehlen | G01D 5/2053 |
| 2020/0018623 A1 * | 1/2020 | Jones | G01D 5/2073 |
| 2021/0302206 A1 * | 9/2021 | Ferreira Da Cunha | G01D 5/2053 |

OTHER PUBLICATIONS

International Search Report and Written Opinion for Application No. PCT/IB2021/051624, dated May 7, 2021, 13 pages.

* cited by examiner

*Primary Examiner* — Steven L Yeninas
(74) *Attorney, Agent, or Firm* — Dority & Manning, P.A.

(57) ABSTRACT

A position sensor is provided. The position sensor includes a target and a segment sensor element. The segment sensor element defines a circumferential direction and a radial direction. The segment sensor element includes a transmit coil. The segment sensor element includes a plurality of receive coils positioned within a space defined by the transmit coil. The plurality of receive coils are offset relative to one another. The shape of each of the plurality of receive coils corresponds to a periodic waveform having a radial width that varies along the circumferential direction. Furthermore, the shape of at least one receive coil of the plurality of receive coils is distorted along at least one of the radial direction or the circumferential direction.

18 Claims, 15 Drawing Sheets

POSITION SENSOR HAVING SEGMENT SENSOR ELEMENT

PRIORITY CLAIM

The present application claims the benefit of priority of U.S. Provisional Application Ser. No. 63/982,983, titled "Position Sensor Having Segment Sensor Element," filed on Feb. 28, 2020, which is incorporated herein by reference.

FIELD

The present disclosure relates generally to position sensors and, more particularly, positions sensors having segment sensor elements.

BACKGROUND

Position sensors can include a target and a sensor element. The target can be mounted to a first object. The sensor element can be mounted to a second object that is stationary relative to the first object. The sensor element can include a transmit coil and a plurality of receive coils. The plurality of receive coils can be inductively coupled to the transmit coil each time the target passes over the sensor element. When the plurality of receive coils are inductively coupled to the transmit coil, each of the plurality of receive coils can output a signal that can be used to determine a position of the first object relative to the second object.

SUMMARY

Aspects and advantages of embodiments of the present disclosure will be set forth in part in the following description, or may be learned from the description, or may be learned through practice of the embodiments.

In one aspect, a position sensor is provided. The position sensor includes a target and a segment sensor element. The segment sensor element defines a circumferential direction and a radial direction. The segment sensor element includes a transmit coil. The segment sensor element includes a plurality of receive coils positioned within a space defined by the transmit coil. The plurality of receive coils are offset relative to one another. The shape of each of the plurality of receive coils corresponds to a periodic waveform having a radial width that varies along the circumferential direction. Furthermore, the shape of at least one receive coil of the plurality of receive coils is distorted along at least one of the radial direction or the circumferential direction.

In another aspect, a position sensor is provided. The position sensor includes a target and a segment sensor element. The segment sensor element defines a circumferential direction and a radial direction. The segment sensor element includes a transmit coil and a plurality of receive coils. The plurality of receive coils are positioned within a space defined by the transmit coil. The plurality of transmit coils each include a first receive coil having a shape corresponding to a first sine wave. The plurality of receive coils each further include a second receive coil having a shape corresponding to a second sine wave that is phase-shifted relative to the first sine wave by about 90 degrees. Furthermore, the shape of the first sine wave or the second sine wave is distorted along at least one of the radial direction or the circumferential direction.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
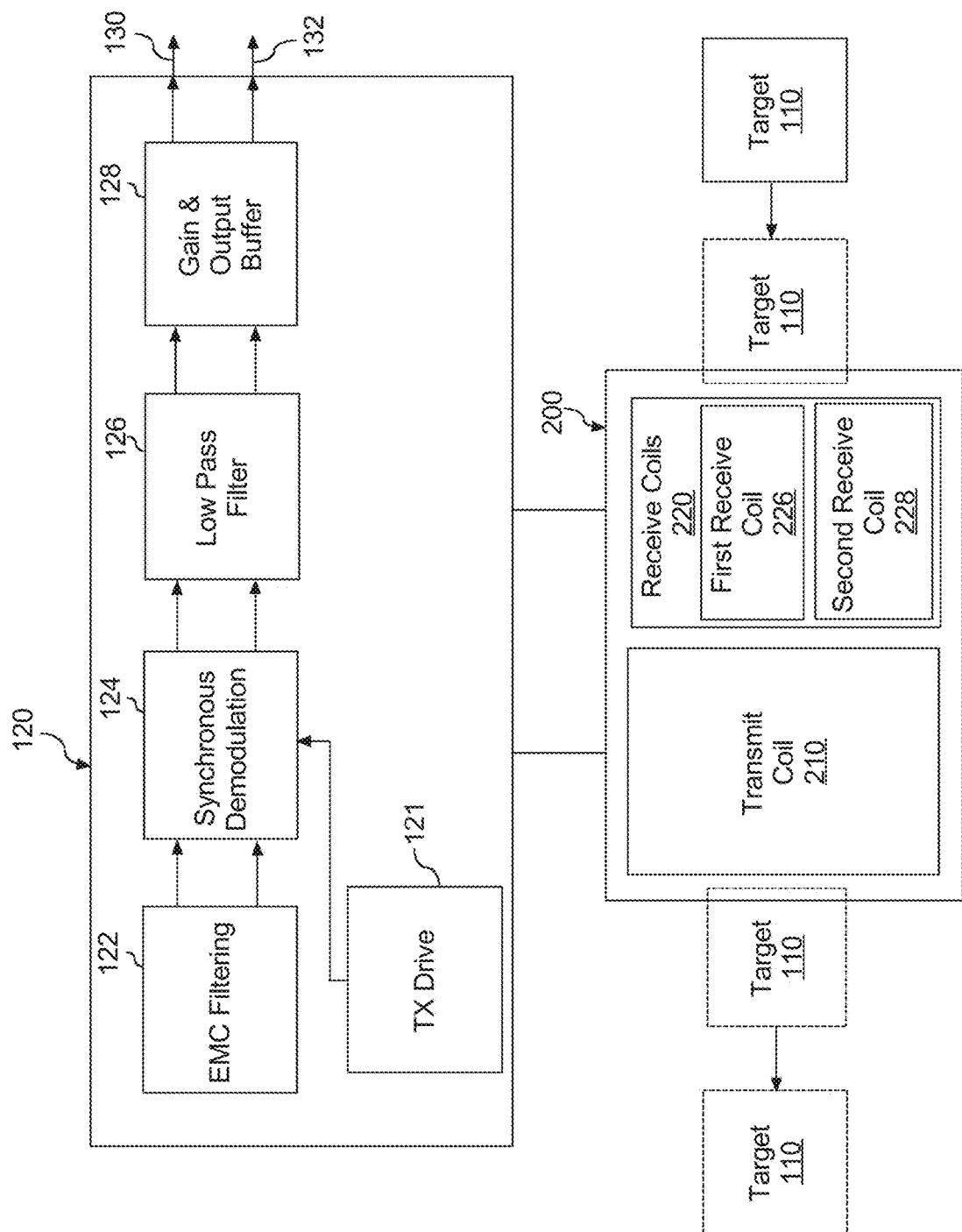
FIG. 1 depicts a position sensor according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to position sensors. Position sensors can include a target that can be mounted to an object. For example, the object can be a rotor of an electric motor. Position sensors can further include a sensor element. The sensor element can be mounted to an object that is stationary and/or mobile relative to the object to which the target is mounted. For example, the object to which the sensor element is mounted can be a stator of the electric motor.

The sensor element can include a transmit coil having one or more turns. The sensor element can further include a plurality of receive coils that are offset relative to one another and each include one or more turns. For instance, in some implementations, a shape of each of the plurality of receive coils can correspond to a periodic waveform (e.g., sinusoidal waveform or quasi-sinusoidal waveform) having a variable amplitude (e.g., radial width). The plurality of receive coils can be disposed within a space defined by the transmit coil. Stated another way, the one or more turns of the transmit coil can define a perimeter of the space in which the plurality of receive coils are disposed.

When the target is positioned over the sensor element, each of the plurality of receive coils can be inductively coupled to the transmit coil via the target. Furthermore, each of the plurality of receive coils can output a signal when inductively coupled to the transmit coil via the target. Processing circuitry (e.g., application specific integrated circuits (ASICs)) can be configured to obtain the signal output by each of the plurality of receive coils. The processing circuitry can be further configured to determine a position of the target relative to the sensor element based, at least in part, on the signal output by each of the plurality of receive coils.

In some instances, an amplitude associated with the output signal of a first receive coil may be different (e.g., larger or smaller) than an amplitude associated with the output signal of a second receive coil. These discrepancies in the amplitude can be due, at least in part, to imperfections in the design of the first receive coil, the second receive coil, or both. Alternatively or additionally, the output signal of the first receive coil, the output signal of the second receive coil, or both may be offset (e.g., not centered at 0).

The processing circuitry can be configured to implement one or more signal processing algorithms to correct non-uniformities associated with one or more parameters (e.g. amplitude, linearity error, etc.) of the signal output by each of the receive coils (e.g., first receive coil, second receive coil). For example, the processing circuitry can be configured to implement a peak detection algorithm to determine a correction to amplitude and/or offset for each of the receive coils.

Typical sensor elements have an annular shape, which can provide a number of advantages. For instance, the annular shape ensures the target passes over the sensor element in a uniform manner. In this manner, the amplitude of the signal output by each of the plurality of receive coils can be more uniform while the target passes over the sensor element. Furthermore, the receive coils (e.g., first receive coil and second receive coil) are balanced due to the annular shape. In this manner, electrical current induced in the receive coils due to direct inductive coupling (e.g., not via the target) between the transmit coil and the receive coils can be nominal. However, sensor elements having the annular shape can be difficult to disassemble.

Segment sensor elements can provide an alternative to sensor elements having the annular shape. For instance, segment sensor elements are easier to remove for maintenance since segment sensor elements do not have an annular shape. However, segment sensor elements lack many of the advantages discussed above that are due, at least in part, to the symmetry of the annular shape. For instance, since segment sensor elements lack the annular shape, the amplitude associated with the signal output by each of the plurality of receive coils is not uniform when the target passes over the segment sensor element. Furthermore, the manner in which non-uniformities occur in the signal output by each of the plurality of receive coils can cause the processing circuitry implementing signal processing algorithms to misinterpret the non-uniformities. In this manner, the processing circuitry can under-compensate or overcompensate for the non-uniformities. As will be discussed below in more detail, example aspects of the present disclosure are directed to segment-based sensor elements for position sensors.

In some implementations, a shape of at least one receive coil of the plurality of receive coils can be distorted along a radial direction. For instance, in some implementations, the shape of the at least one receive coil can be distorted along the radial direction such that a radial width (e.g., amplitude) at one or more locations (e.g., end portions) on the first receive coil are reduced relative to the radial width at the one or more locations on the at least one receive coil prior to being distorted along the radial direction. In some implementations, the radial width at the one or more locations on the at least one receive coil can be reduced such that the radial width at the one or more locations on the at least one receive coil ranges from about 50% to about 70% of the radial width at the one or more locations on the at least one receive coil prior to being distorted along the radial direction. It should be appreciated, however, that the radial width at the one or more locations on the at least one receive coil can be reduced by any suitable amount needed to reduce a difference (e.g., delta) between a maximum amplitude of the output signal and a minimum amplitude of the output signal. In this manner, the amplitude of the output signal of the at least one receive coil can be more uniform when the target is passing over the receive coils.

It should also be understood that distorting the shape of at least one receive coil along the radial direction as discussed above can affect the linearity (e.g., error) of the output signal (e.g., atan function) of the segment sensor element. In particular, the output signal of the segment sensor element subsequent to distorting the at least one receive coil along the radial direction can deviate from the output signal of the segment sensor element prior to distorting the at least one receive coil along the radial direction. As will be discussed below, the at least one receive coil can be distorted along the circumferential direction to compensate for the change in the linearity of the output signal of the segment sensor element that is due, at least in part, to distortion of the at least one receive coil along the radial direction.

In addition to distorting the shape of the at least one receive coil along the radial direction, it should be appreciated that, in some implementations, a mathematical function describing the shape of the at least one receive coil can be adjusted to introduce one or more higher order harmonics. For instance, in some implementations, the mathematical function can be adjusted to introduce a third order harmonic. It should be appreciated, however, that the mathematical function can be adjusted to introduce a harmonic of any suitable order.

In some implementations, the shape of the at least one receive coil can be distorted along the circumferential direction such that a slope at one or more locations on the at least one receive coil is different than the slope at the one or more locations prior to the at least one receive coil being distorted along the circumferential direction. For instance, the at least one receive coil can be stretched at the one or more locations thereon such that the slope at the one or more locations is different than the slope at the one or more locations prior to the at least one receive coil being stretched along the circumferential direction. Alternatively, the at least one receive coil can be compressed at the one or more locations such that a slope at the one or more locations is different than the slope at the one or more locations prior to the at least one receive coil being compressed along the circumferential direction.

In some implementations, imperfections in the design of the plurality of receive coils can introduce higher-order harmonics (e.g., fourth-order) into the signal output by each of the plurality of receive coils. In such implementations, the receive coils can be distorted along the circumferential direction at one or more locations thereon to introduce a lower-order harmonic into the output signal of each of the plurality of receive coils to compensate for the higher-order harmonics in the output signal that are due, at least in part, to imperfections in the design of the plurality of receive coils. For instance, in some implementations, each of the receive coils can be stretched at one or more locations thereon to introduce a third-order harmonic into the output signal of each of the receive coils. In this manner, the third-order harmonic can compensate for a fourth-order harmonic in the output signal that is due, at least in part, to imperfections in the design of the receive coils.

In addition to distorting the at least one receive coil of the plurality of receive coils along the circumferential direction, the plurality of receive coils can be offset relative to one another. In particular, a phase angle associated with a mathematical function describing the shape of each of the plurality of receive coils can be adjusted to create a phase or quadrature mismatch between the plurality of receive coils. In particular, the phase angle can be adjusted such that the plurality of receive coils are not 90 degrees out of phase relative to one another. In this manner, a second order harmonic can be introduced to compensate for second order harmonics associated with the linearity error of the output signal of each of the plurality of receive coils.

In some implementations, the transmit coil can be distorted along at least one of the radial direction or the circumferential direction instead of distorting at least one receive coil of the plurality of receive coils along the radial direction. However, it should be understood that, in such implementations, the at least one receive coil is still distorted along the circumferential direction. Furthermore, it should be appreciated that the transmit coil can be distorted along at least one of the radial direction or the circumferential direction in the same manner as discussed above with reference to the receive coils.

In some implementations, the segment sensor element can include a breakthrough balancing structure positioned along the circumferential direction between the transmit coil and the receive coils. The breakthrough balancing structure can include a first coil and a second coil that is spaced apart from the first coil along the radial direction. The first coil and the second coil can each be connected to the first receive coil and the second receive coil. Furthermore, the second coil can be counter wound relative to the first coil. In this manner, electrical current flows in opposite directions in the first coil and the second coil, respectively. For instance, electrical current induced in the first coil flows in a first direction (e.g., clockwise). Conversely, electrical current induced in the second coil flows in a second direction (e.g., counterclockwise) that is opposite the first direction.

When the target passes over the breakthrough balancing structure, the inductive coupling between the coils (e.g. first coil and second coil) and the transmit coil cancels out, resulting in no net coupling. Additionally, the arrangement of the first coil and the second coil relative to one another reduces coupling between the coils (e.g., first coil and second coil) and the target. In this manner, error associated with the signal output by each of the plurality of receive coils can be reduced and, as a result, error associated with the signal indicative of the position of the target relative to the segment sensor element can be reduced.

In some implementations, the breakthrough balancing structure can include a third coil and a fourth coil that is spaced apart from the third coil along the radial direction. The third coil and the fourth coil can each be connected to the transmit coil. Furthermore, the fourth coil can be counter wound relative to the third coil. In this manner, electrical current flows in opposite directions in the third coil and the fourth coil. For instance, electrical current induced in the third coil flows in the first direction (e.g., clockwise). Conversely, electrical current induced in the fourth coil flows in the second direction (e.g., counterclockwise).

When the target passes over the breakthrough balancing structure, the inductive coupling between the coils (e.g. third coil and fourth coil) and the plurality of receive coils cancels out, resulting in no net coupling. Additionally, the arrangement of the third coil and the fourth coil relative to one another reduces coupling between the coils (e.g., third coil and fourth coil) and the target. In this manner, error associated with the signal output by each of the plurality of receive coils can be reduced and, as a result, error associated with the signal indicative of the position of the target relative to the segment sensor element can be reduced.

The segment sensor element according to example embodiments of the present disclosure can provide numerous technical effects and benefits. For example, the shape of at least one receive coil of the plurality of receive coils of the segment sensor element can be distorted along the radial direction. In particular, the at least one receive coil can be distorted at one or more locations thereon such that a difference between a maximum amplitude and minimum amplitude of the signal output by the at least one receive coil is reduced. In this manner, the amplitude of the output signal can be more uniform (e.g., constant) while the target passes over the receive coils. Furthermore, the shape of the at least one receive coil can be distorted along the circumferential direction to improve linearity associated with the signal output by the at least one receive coil. As used herein, the term "about" refers to a range of values within 25% of a stated numerical value.

Referring now to the FIGS., FIG. 1 depicts a position sensor 100 according to example embodiments of the present disclosure. As shown, the position sensor 100 can include a target 110. The target 110 can be any object that includes metal. For instance, in some implementations, the target 110 can be a metal enclosure for a circuit board. In alternative implementations, the target 110 can include a wire loop structure. The target 110 can be mounted to a first object (not shown). In some implementations, the first object can be a rotor of an electric motor.

The position sensor 100 can further include a segment sensor element 200. The segment sensor element 200 can be mounted to a second object (also not shown) that is stationary (e.g., does not move) relative to the first object. For instance, in some implementations, the second object can be a stator of the electric motor. The segment sensor element 200 can include a transmit coil 210 having one or more turns.

The segment sensor element 200 can further include a plurality of receive coils 220 having one or more turns. In some implementations, the plurality of receive coils 220 can include a first receive coil 226 and a second receive coil 228 that are offset (e.g., phase-shifted) relative to one another. It should be appreciated, however, that the segment sensor element 200 can include more than two receive coils. For instance, in some implementations, the plurality of receive coils can include three separate receive coils that are offset (e.g., phase-shifted) relative to one another by about 120 degrees.

The transmit coil 210, the first receive coil 226, and the second receive coil 228 can each be formed by a respective conductive winding, with the ends of each conductive winding electrically coupled to respective terminals of processing circuitry 120, such as an Application Specific Integrated Circuit (ASIC) or an Application Specific Standard Product (ASSP). In alternative implementations, the processing circuitry 120 could alternatively utilize multiple interconnected devices and/or can be implemented using one or more suitable components (e.g., electronic components, such as discrete electronic components).

As shown in FIG. 1, the processing circuitry 120 includes a transmission ("TX") drive stage 122 which generates an alternating electrical signal for supply to the transmit coil 210 of the segment sensor element 200. In some implementations, the TX drive stage 121 is a free running oscillator that generates an alternating electrical signal at a drive frequency determined by the inductance of the excitation coil and the capacitance of a capacitor (not shown) connected in parallel to the transmit coil 210. In some implementations, the target 110 is a resonant circuit and the drive frequency is set to the resonant frequency of that resonant circuit. It should be appreciated that, in some implementations, the resonant frequency of the resonant circuit can range from about 1 MHz to about 6 MHz.

Supplying an alternating current to the transmit coil 210 induces electromotive forces in the first receive coil 226 (e.g., sine coil) and the second receive coil 228 (e.g., cosine coil), which cause current to flow in the first receive coil 226 and the second receive coil 228. As a result of the layout of the first receive coil 226 and the second receive coil 228 with respect to the layout of the transmit coil 210, the electromotive forces induced directly in the first receive coil 226 and the second receive coil 228 are balanced and therefore cause negligible current to flow in the first receive coil 226 and the second receive coil 228. However, the electromotive forces induced via the target 110 do cause current to flow in the first receive coil 226 and the second receive coil 228.

In some implementations, each of the plurality of receive coils 220 can be formed from a separate winding such that a separate current flows in each of the plurality of receive coils 220. For instance, the first receive coil 226 and the second receive coil 228 can each be formed from separate windings such that separate currents flow in the first receive coil 226 and the second receive coil 228. Furthermore, the first receive coil 226 and the second receive coil 228 can be connected to separate terminals of the processing circuitry 120, with the current flowing in the first receive coil 226 being processed to provide a first output signal 130 and the current flowing in the second receive coil 228 being processed to provide a second output signal 132.

On entering the processing circuitry 120, current flowing in the first receive coil 226 first goes through an EMC filtering stage 122 to reduce signal components at frequencies away from the drive frequency. The filtered out signal components may be caused, for example, by interference from electrical signals generated by other nearby electrical components.

The filtered electrical signal then goes through a synchronous demodulation stage 124 in which the filtered electrical signal is mixed with a demodulation signal from the TX drive stage 121. The processing circuitry 120 can be configured for use with a non-resonant rotor target, and therefore the demodulation signal is in phase with the drive signal. As will be discussed in more detail hereafter, to enable the integrated circuit to be used with a target in the form of a resonant circuit, the first receive coil 226 forms part of a parallel resonant circuit so that the demodulated electrical signal resulting from the synchronous demodulation has a baseband component whose magnitude varies in dependence on the relative position of the first and second members and higher frequency components at twice the drive frequency and at higher harmonics of the drive frequency.

The demodulated electrical signal then passes through a low pass filtering stage 126 to remove the high frequency components corresponding to harmonics of the drive signal, leaving the baseband component, and then passes through gain and output buffer stage 128, which allows an adjustable gain to be applied before the first output signal 130 is output by the processing circuitry 120. It should be understood that current induced in the second receive coil 228 also undergoes the EMC filtering stage 122, the synchronous demodulation stage 124, the low pass filtering stage 126, and the gain and output buffering stage 128 before being output as the second output signal 132.

In some implementations, the processing circuitry 120 can be configured to determine a position of the target 110 relative to the segment sensor element 200 based, at least in part, on the first output signal 130 and the second output signal 132. For instance, the position of the target 110 relative to the segment sensor element 200 can correspond to the arc tangent of the first output signal 130 divided by the second output signal 132. In such implementations, the processing circuitry 120 can be configured to output a position signal indicative of the position of the target 110 relative to the segment sensor element 200.

Figure 2:
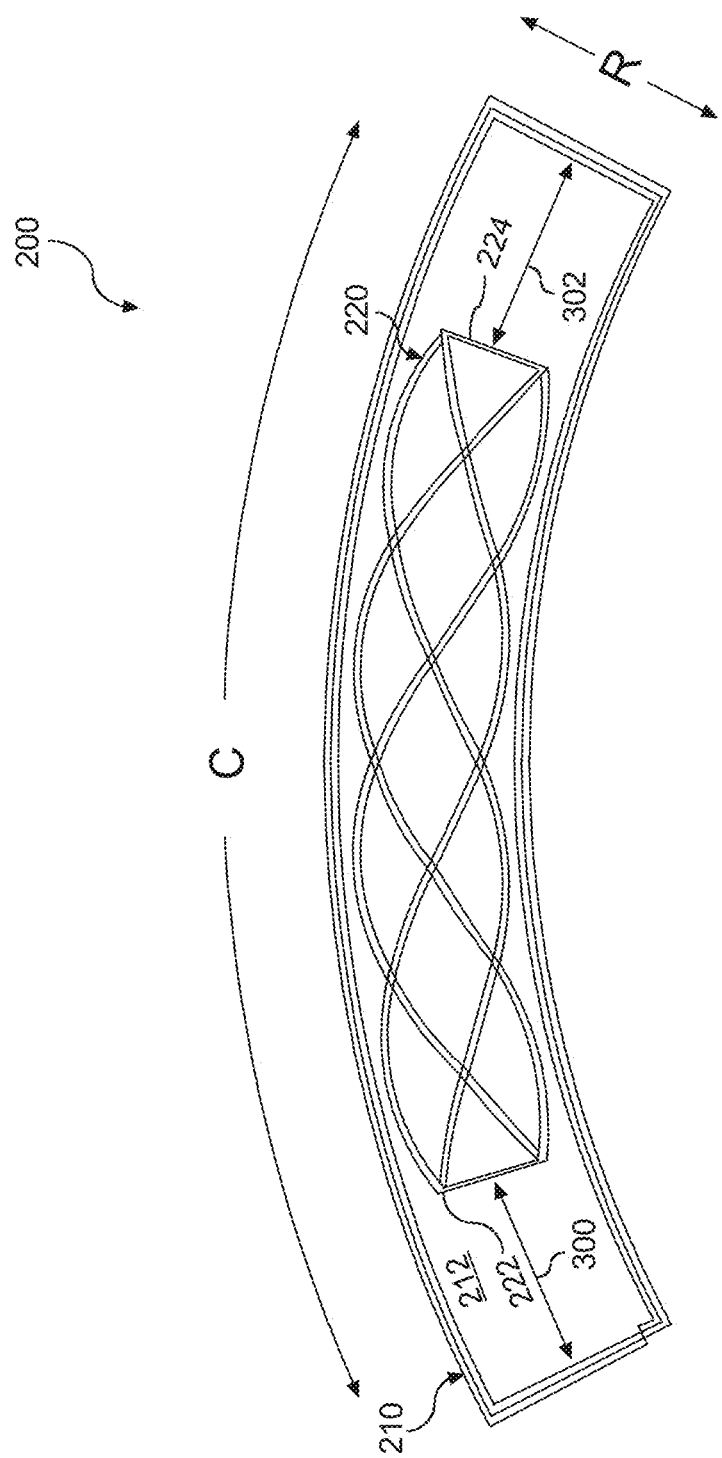
FIG. 2 depicts a schematic of a segment sensor element of a position sensor according to example embodiments of the present disclosure.

Referring now to FIG. 2, an example embodiment of the segment sensor element 200 is provided. The segment sensor element 200 can define a circumferential direction C and a radial direction R. As shown, the plurality of receive coils 220 can be positioned within a space 212 defined by the transmit coil 210. More specifically, the one or more turns of the transmit coil 210 can define the perimeter of the space 212 in which the plurality of receive coils 220 are positioned. As shown, each of the plurality of receive coils 220 can include a first end portion 222 and a second end portion 224 that is spaced apart from the first end portion 222 along the circumferential direction C. Furthermore, the shape of each of the plurality of receive coils 220 can correspond to a periodic waveform (e.g., sinusoidal shape or quasi-sinusoidal shape) having a radial width that varies along the circumferential direction C.

In some implementations, a length of the transmit coil 210 can be greater than a length of each of the plurality of receive coils 220 to reduce direct inductive coupling (e.g., not via the target 110) between the transmit coil 210 and the end portions (e.g., first end portion 222 and second end portion 224) of each of the plurality of receive coils 220. For instance, the transmit coil 210 can be about half a coil wavelength longer than each of the plurality of receive coils 220. It should be appreciated, however, that the length of the transmit coil 210 can be greater than the length of each of the plurality of receive coils 220 by any suitable amount needed to reduce direct inductive coupling between the transmit coil 210 and the end portions (e.g., first end portion 222 and second end portion 224) of each of the plurality of receive coils 220.

As shown, in some implementations, the plurality of receive coils 220 can be positioned within the space 212 such that the first end portion 222 of each of the plurality of receive coils 220 and the second end portion 224 of each of the plurality of receive coils 220 is spaced apart from the transmit coil 210 along the circumferential direction C by a first distance 300 and a second distance 302, respectively. In some implementations, the first distance 300 and the second distance 302 can be the same. For example, the first distance 300 and the second distance 302 can each be a quarter coil wavelength. As another example, the first distance 300 and the second distance 302 can correspond to an arc length that ranges from about 5 degrees to about 15 degrees. It should be appreciated that, in alternative implementations, the first distance 300 can be different (e.g., shorter, longer) than the second distance 302.

As discussed above, the length of the transmit coil 210 can be greater than the length of each of the plurality of receive coils 220 along the circumferential direction C to reduce or eliminate direct inductive coupling between the transmit coil 210 and end portions (e.g., first end portion 222 and second end portion 224) of each of the plurality of receive coils 220. However, since the segment sensor element 200 lacks symmetry, the amplitude (e.g., signal level) of the output signal of each of the plurality of receive coils 220 is non-uniform when the target 110 passes over the plurality of receive coils 220. For instance, when the target 110 (FIG. 1) passes over the end portions (e.g., first end portion 222 and second end portion 224) of each of the plurality of receive coils 220, the amplitude of the output signal of each of the plurality of receive coils 220 is greater than the amplitude of the output signal of each of the plurality of receive coils 220 when the target 110 is positioned over a middle portion of the plurality of receive coils 220. As will be discussed below in more detail, the shape of at least one of the plurality of receive coils 220 can be distorted along the radial direction R to reduce a difference between a maximum amplitude and minimum amplitude associated with the output signal of the at least one receive coil of the plurality of receive coils. In this manner, the amplitude of the output signal of the at least one receive coil can be more uniform while the target 110 passes over the at least one receive coil of the plurality of receive coils 220.

Figure 3:
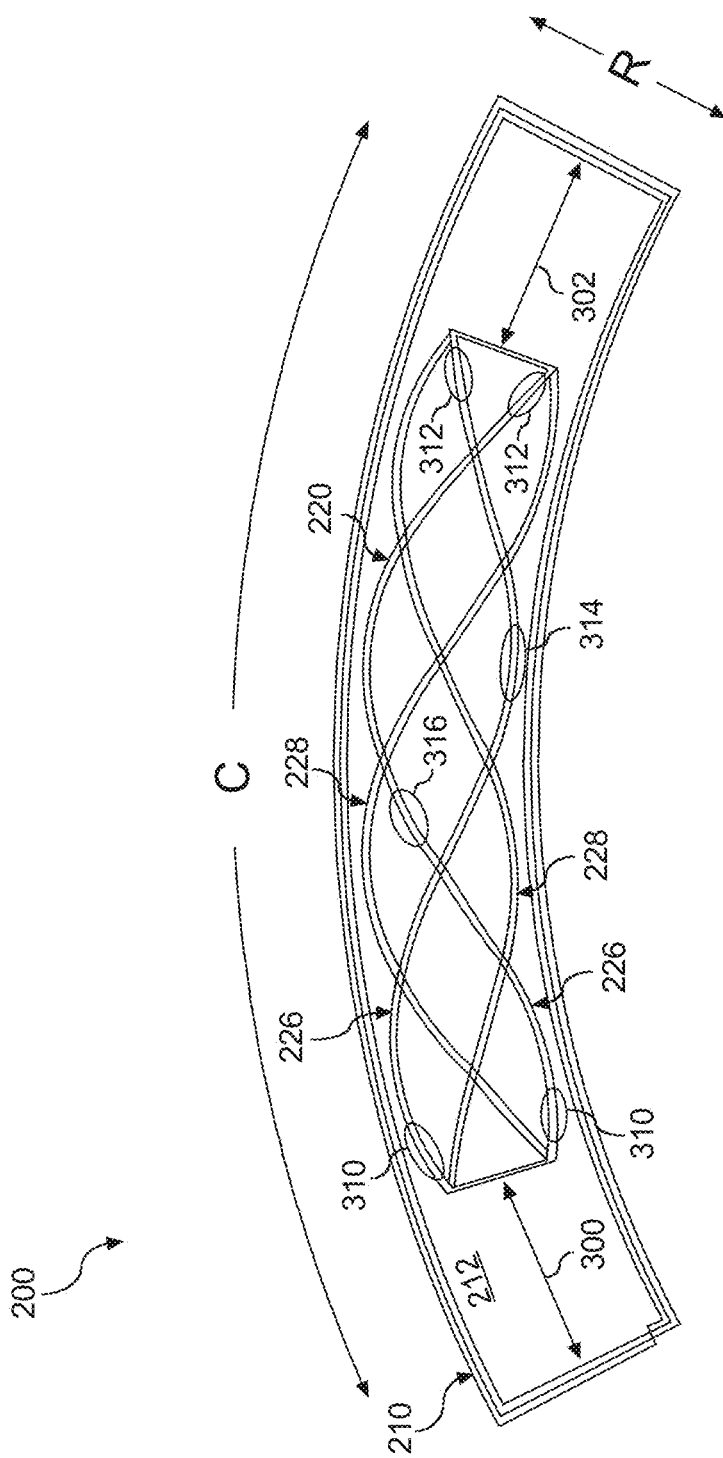
FIG. 3 depicts a segment sensor element prior to distorting at least one receive coil thereof along at least one of a radial direction or a circumferential direction according to example embodiments of the present disclosure.
Figure 4:
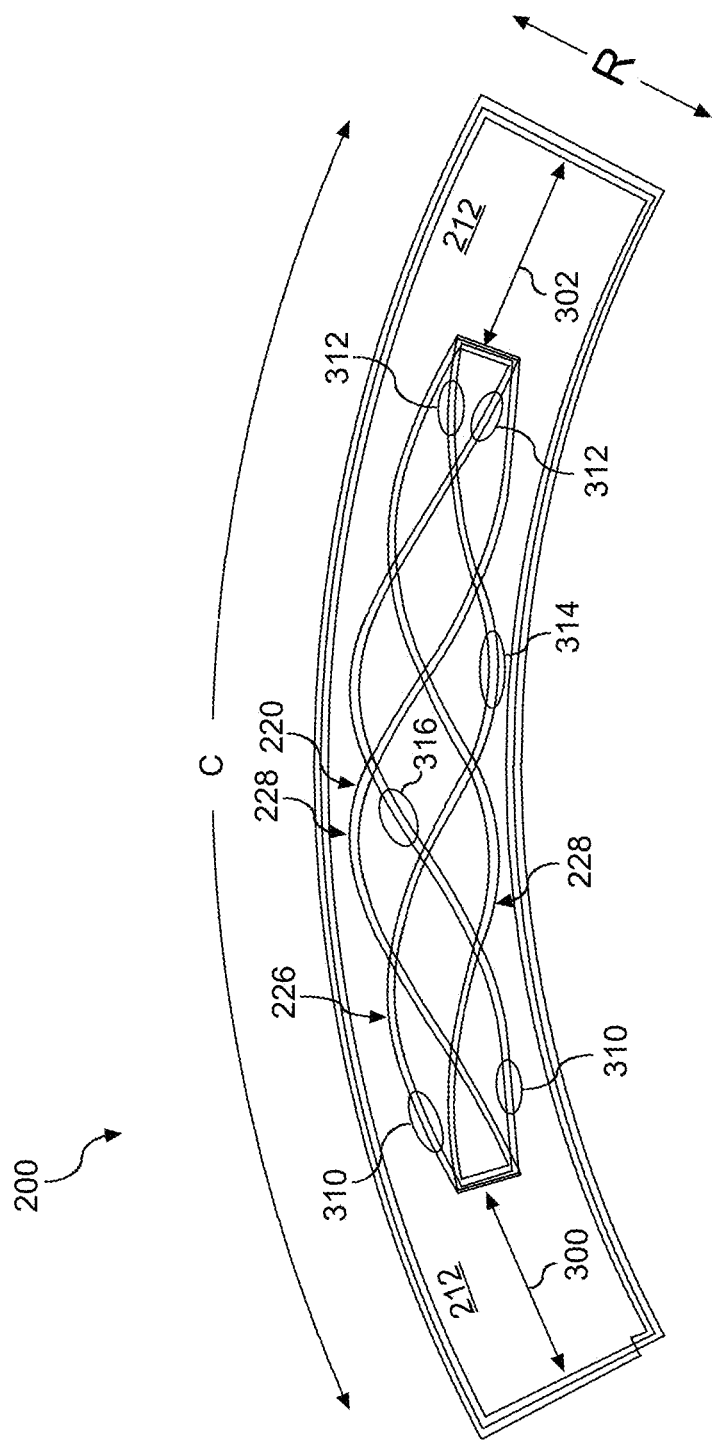
FIG. 4 depicts a segment sensor element subsequent to distorting at least one receive coil thereof along at least one of a radial direction or a circumferential direction according to example embodiments of the present disclosure.

Referring now to FIGS. 3 and 4, a first embodiment (FIG. 3) of the segment sensor element 200 and a second embodiment (FIG. 4) of the segment sensor element 200 are provided according to example embodiments of the present disclosure. In the first embodiment (FIG. 3), the shape of the plurality of receive coils 220 is not distorted along the radial direction R or the circumferential direction C. In the second embodiment (FIG. 4), the shape of at least one receive coil of the plurality of receive coils 220 is distorted along at least one of the radial direction R or the circumferential direction C. These distortions to the shape of at least one receive coil of the plurality of receive coils 220 will now be discussed below in more detail.

In some implementations, the shape of the first receive coil 226 can be distorted along the radial direction R such that a radial width (e.g., amplitude) at one or more locations 310, 312 on the first receive coil 226 are reduced relative to the radial width at the one or more locations 310, 312 on the first receive coil 226 prior to being distorted along the radial direction R. In some implementations, the radial width at the one or more locations 310, 312 on the first receive coil 226 can be reduced such that the radial width at the one or more locations 310, 312 on the first receive coil 226 ranges from about 50% to about 70% of the radial width at the one or more locations 310, 312 on the first receive coil 226 prior to being distorted along the radial direction R. It should be appreciated, however, that the radial width at the one or more locations 310, 312 on the first receive coil 226 can be reduced by any suitable amount needed to reduce a difference (e.g., delta) between a maximum amplitude of the output signal and a minimum amplitude of the output signal. In this manner, the amplitude of the output signal of the first receive coil 226 can be more uniform when the target 110 is passing over the first receive coil 226.

It should be appreciated that the one or more locations 310, 312 on the first receive coil 226 can correspond to any suitable location on the first receive coil 226. For instance, in some implementations, location 310 can correspond to the first end portion 222 (FIG. 2) of the first receive coil 226, whereas location 312 can correspond to the second end portion 224 (FIG. 2) of the first receive coil 226. Furthermore, in some implementations, the shape of first receive coil 226 can be distorted along the radial direction R such that the radial width at only one end portion (e.g., first end portion 222 or second end portion 224) of the first receive coil 226 is reduced. In alternative implementations, the shape of the first receive coil 226 can be distorted along the radial direction R such that the radial width at each end portion (e.g., first end portion 222 and second end portion 224) of the first receive coil 226 is reduced.

In some implementations, the shape of the first receive coil 226 can be distorted along the radial direction R at a location 314 on the first receive coil 226 that is positioned between the end portions (e.g., first end portion 222 and second end portion 224) of the first receive coil 226 along the circumferential direction C. For instance, in some implementations, the shape of the first receive coil 226 can be distorted along the radial direction R such that the radial width at the location 314 on the first receive coil 226 is increased relative to the radial width at the location 314 on the first receive coil 226 prior to being distorted along the radial direction R. It should be understood that the radial width at the location 314 on the first receive coil 226 can be increased by any suitable amount. For instance, in some implementations, the shape of the first receive coil 226 can be distorted along the radial direction R such that the radial width at the location 314 on the first receive coil 226 is about 30% wider compared to the radial width at the location 314 on the first receive coil 226 prior to being distorted along the radial direction R.

It should be understood that the second receive coil 228 can be distorted along the radial direction R in the same manner as discussed above with reference to the first receive coil 226. It should also be understood that distorting the shape of at least one receive coil (e.g., first receive coil 226 and/or second receive coil 228) of the plurality of receive coils 220 along the radial direction R as discussed above can affect the linearity (e.g., error) of the output signal (e.g., atan function) of the segment sensor element 200. In particular, the output signal of the segment sensor element 200 of FIG. 4 can deviate from the output signal of the segment sensor element 200 of FIG. 3 due, at least in part, to the at least one receive coil of the segment sensor element 200 of FIG. 4 being distorted along the radial direction R. As will be discussed below, the at least one receive coil of the segment sensor element 200 of FIG. 4 can be distorted along the circumferential direction C to compensate for the change in the linearity of the output signal of the segment sensor element 200 of FIG. 4 that is due, at least in part, to distortion of the at least one receive coil along the radial direction R.

In some implementations, the shape of the first receive coil 226 can be distorted along the circumferential direction C such that a slope at one or more locations 316 on the first receive coil 226 is different than the slope at the one or more locations 316 prior to the first receive coil 226 being distorted along the circumferential direction C. For instance, the first receive coil 226 can be stretched at the one or more locations 316 on the first receive coil 226 such that the slope at the one or more locations 316 is different than the slope at the one or more locations prior to the first receive coil 226 being stretched along the circumferential direction C. Alternatively, the first receive coil 226 can be compressed at the one or more locations 316 such that a slope at the one or more locations 316 is different than the slope at the one or more locations 316 prior to the first receive coil 226 being compressed along the circumferential direction C.

In some implementations, the shape of the first receive coil 226 can be distorted along the circumferential direction C such that the first receive coil 226 is compressed at a first location on the first receive coil 226. In addition, the first receive coil 226 can be distorted along the circumferential direction C such that the first receive coil 226 is stretched at a second location on the first receive coil 226 that is different than the first location. In this manner, the distortion to the shape of the first receive coil 226 at the first location thereon can be different than the distortion to the shape of the first receive coil 226 at the second location thereon.

It should also be understood that the second receive coil 228 can be distorted along the circumferential direction C in the same manner as discussed above with reference to the first receive coil 226. For instance, the second receive coil 228 can be stretched at one or more locations on the second receive coil 228 such that the slope at the one or more locations is different than the slope at the one or more locations prior to the second receive coil 228 being distorted along the circumferential direction C. Alternatively, the second receive coil 228 can be compressed at the one or more locations such that a slope at the one or more locations is different than the slope at the one or more locations prior to the second receive coil 228 being distorted along the circumferential direction C. It should be understood that, in some implementations, the second receive coil 228 can be distorted along the circumferential direction C such that the second receive coil 228 is compressed at a first location on the second receive coil 228 and stretched at a second location on the second receive coil 228 that is different than the first location. In this manner, the distortion to the shape of the second receive coil 228 at the first location thereon can be different than the distortion to the shape of the second receive coil 228 at the second location thereon.

Figure 5:
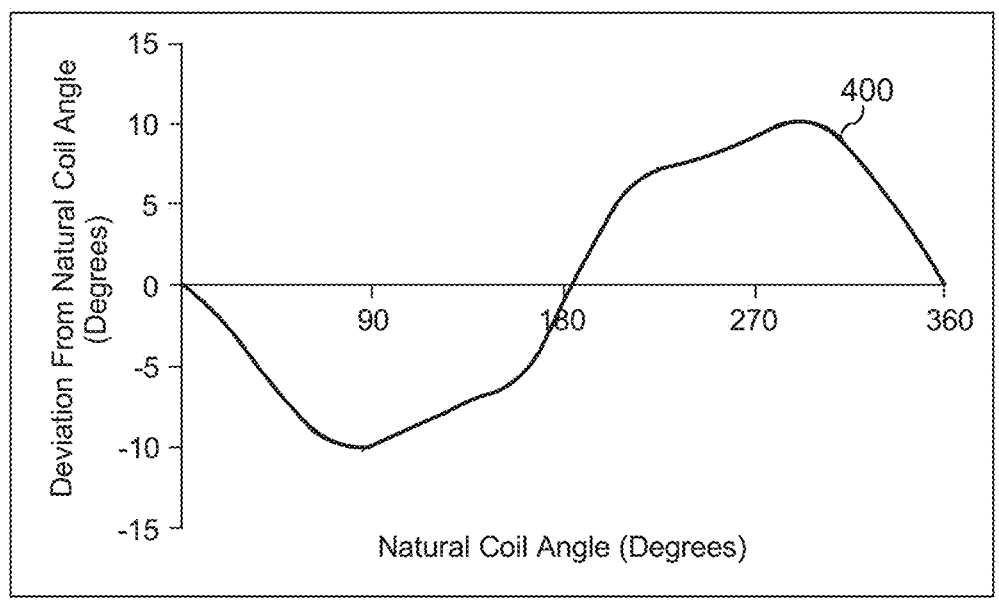
FIG. 5 depicts a graphical representation of a lead-lag relationship an output signal of a receive coil that has been distorted along the radial direction and circumferential direction has with an output signal of a receive coil that has not been distorted along the radial direction and the circumferential direction according to example embodiments of the present disclosure.

Referring now to FIG. 5, a graphical representation of deviation of the position signal of the segment sensor element 200 of FIG. 4 from the position signal of the segment sensor element 200 of FIG. 3 is provided according to example embodiments of the present disclosure. In some implementations, the at least one receive coil of the segment sensor element of FIG. 4 can be distorted along the circumferential direction C such that the position signal of the segment sensor element of FIG. 4 and the position signal of the segment sensor element of FIG. 3 have a lead-lag relationship. For instance, curve 400 illustrates the position signal of the segment sensor element of FIG. 4 can lag the position signal of the segment sensor element of FIG. 3 when the output angle ranges from 0 degrees to 180 degrees. Furthermore, curve 400 illustrates the position signal of the segment sensor element of FIG. 4 can lead the position signal of the segment sensor element of FIG. 3 when the output angle ranges from greater than 180 degrees to 360 degrees.

Figure 6:
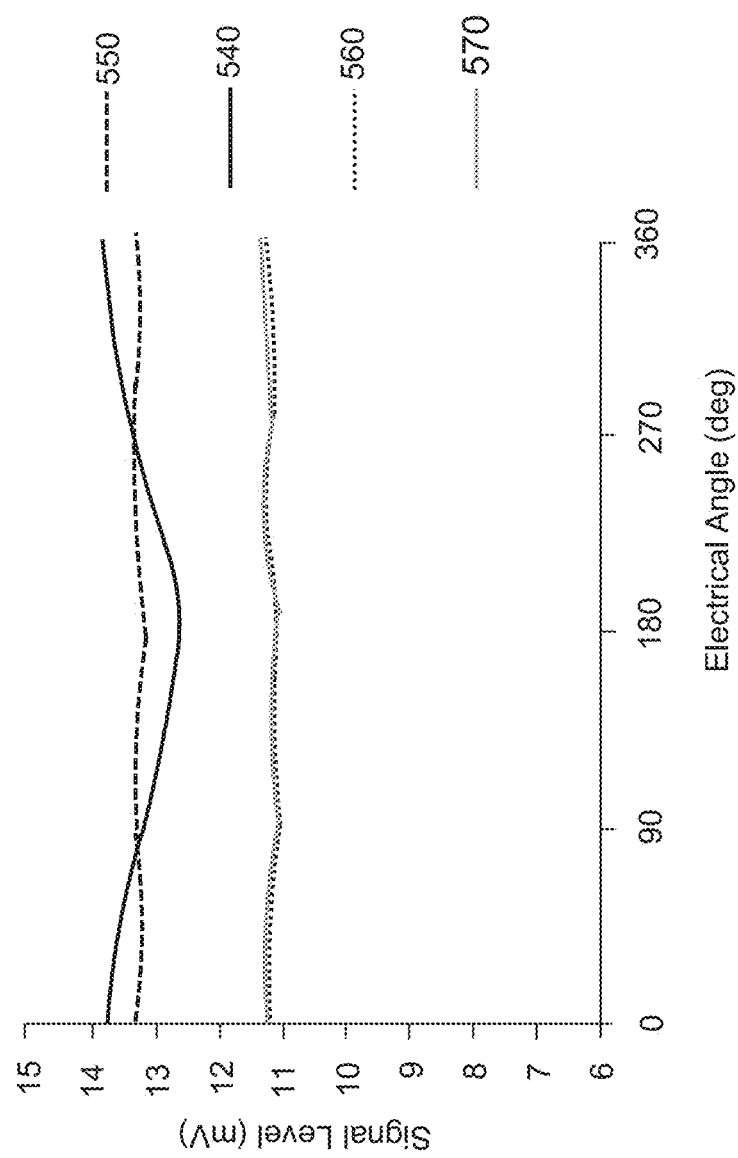
FIG. 6 depicts a graphical representation of a signal level associated with an output signal of a position sensor as a function of an electrical angle according to example embodiments of the present disclosure.

Referring briefly now to FIG. 6, a graphical representation of an amplitude (denoted along the vertical axis in millivolts) of an output signal of a receive coil of the segment sensor element 200 (FIGS. 3 and 4) as a function of an electrical angle (denoted along the horizontal axis in degrees) is provided according to example embodiments of the present disclosure. Curve 540 denotes the amplitude of the output signal without implementing any signal processing algorithms (e.g., amplitude correction, offset correction, etc.) on the output signal and without distorting the shape of the first receive coil 226 along the radial direction R. As shown, the amplitude of the output signal when the target 110 is positioned over the end portions (e.g., first end portion 222 and second end portion 224) of the receive coil is higher than the amplitude of the output signal when the target 110 is positioned over a middle portion (e.g., 180 degrees) of the receive coil. As will be discussed below, one or more signal processing algorithms (e.g., amplitude correction, offset correction, etc.) can be implemented on the output signal of the receive coil to reduce a difference (e.g., delta) between a maximum amplitude of the output signal and a minimum amplitude of the output signal. Alternatively, the shape of the receive coil can be distorted along the radial direction R as discussed above to reduce the difference between the maximum amplitude of the output signal and the minimum amplitude of the output signal.

Curve 550 illustrates the one or more signal processing algorithms (e.g., amplitude correction, offset correction, etc.) can be implemented on the output signal of the receive coil such that the amplitude of the output signal when the target 110 is positioned over the end portions of the receive coil is reduced relative to curve 540. Furthermore, as shown, a difference (e.g., delta) between the maximum amplitude and minimum amplitude of curve 550 is less than a difference between a maximum amplitude and minimum amplitude of the output signal illustrated by curve 540.

Curve 560 illustrates that the shape of the receive coil can be distorted along the radial direction R such that the amplitude of the output signal when the target 110 is positioned over the end portions of the receive coil is reduced relative to curve 540 and curve 550. In addition, curve 560 illustrates that the amplitude of the output signal when the target 110 is positioned at a middle portion of the receive coil is reduced relative to amplitude of the output signal illustrated by curve 540 and curve 550. Furthermore, a difference between the maximum amplitude and minimum amplitude of the output signal illustrated by curve 560 is less than the difference between the maximum amplitude and minimum amplitude of the output signal illustrated by curve 550. In this manner, the difference between the maximum amplitude and minimum amplitude of the output signal when distorting the shape of the receive coil along the radial direction R can be less than the difference between the maximum amplitude and minimum amplitude of the output signal when implementing one or more signal processing algorithms on the output signal.

Curve 570 illustrates that the difference between the maximum and minimum amplitude of the output signal illustrated by curve 560 cannot be further reduced by additionally implementing one or more signal processing algorithms on the output signal of the receive coil. However, as discussed above, distorting the shape of at least one receive coil of the plurality of receive coils 220 along the radial direction R can affect the linearity of the output signal of the at least one receive coil.

Figure 7:
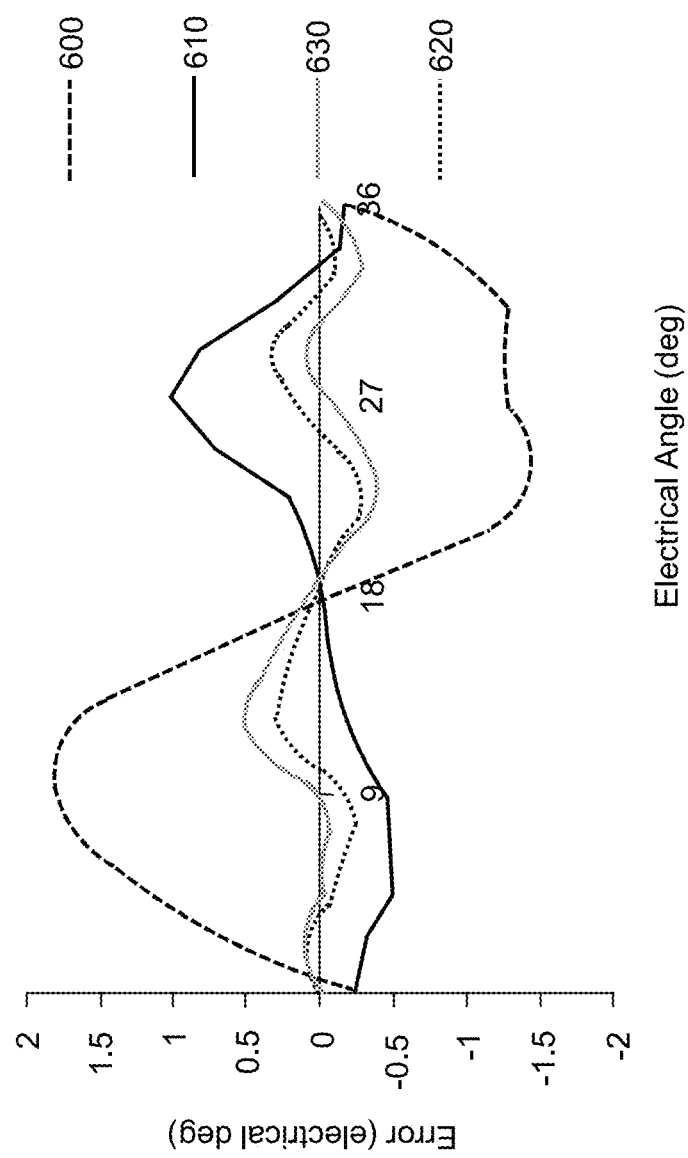
FIG. 7 depicts a graphical representation of a linearity error associated with an output signal of a receive coil of a segment sensor element as a function of an electrical angle according to example embodiments of the present disclosure.

Referring now to FIG. 7, a graphical representation of a linearity error (denoted along the vertical axis in degrees) associated with the output signal of a receive coil of the segment sensor element 200 (FIGS. 3 and 4) as a function of electrical angle (denoted along the horizontal axis in degrees) is provided according to example embodiments of the present disclosure. It should be understood that the linearity error refers to a deviation of the output signal of the receive coil subsequent to distorting the shape of the receive coil along the radial direction R and the circumferential direction C compared to the output signal of the receive coil before distorting the shape of the receive coil along the radial direction R and the circumferential direction.

Curve 600 illustrates the linearity error associated with the output signal of the first receive coil 226 without implementing any signal processing algorithms (e.g., amplitude correct, offset correction, etc.) on the output signal and without distorting the shape of the receive coil along the radial direction R and the circumferential direction C. Curve 610 illustrates the linearity error associated with the output signal when one or more signal processing algorithms are implemented on the output signal. Curve 620 illustrates the linearity error associated with the output signal when the receive coil is distorted along the radial direction R and the circumferential direction C. Curve 630 denotes the linearity error associated with the output signal when one or more signal processing algorithms are implemented on the output signal and the shape of the receive coil is distorted along the radial direction R and the circumferential direction C.

In some implementations, imperfections in the design of the plurality of receive coils 220 can introduce higher-order harmonics (e.g., fourth-order) into the output signal of each of the plurality of receive coils 220. In such implementations, the receive coils 220 can be distorted along the circumferential direction C at one or more locations thereon to introduce a lower-order harmonic into the output signal of each of the plurality of receive coils 220 to compensate for the higher-order harmonics in the output signal that are due, at least in part, to imperfections in the design of the plurality of receive coils 220. For instance, in some implementations, each of the receive coils 220 can be stretched at one or more locations thereon to introduce a third-order harmonic into the output signal of each of the receive coils 220. In this manner, the third-order harmonic can compensate for a fourth-order harmonic in the output signal that is due, at least in part, to imperfections in the design of the receive coils 220.

In addition to distorting the at least one receive coil of the plurality of receive coils along the circumferential direction C, the plurality of receive coils 220 can be offset relative to one another. In particular, a phase angle associated with a function describing each of the plurality of receive coils 220 can be adjusted to create a phase or quadrature mismatch between the plurality of receive coils 220. In particular, the phase angle can be adjusted such that the plurality of receive coils 220 are not 90 degrees out of phase relative to one another. In this manner, a second order harmonic can be introduced to compensate for second order harmonics associated with second-order harmonics associated with the linearity error of the output signal of each of the plurality of receive coils 220.

In some implementations, the transmit coil 210 can be distorted along at least one of the radial direction R or the circumferential direction C instead of distorting at least one receive coil of the plurality of receive coils 220 along the radial direction R. However, it should be understood that, in such implementations, the at least one receive coil is still distorted along the circumferential direction C. Furthermore, it should be appreciated that the transmit coil 210 can be distorted along at least one of the radial direction R or the circumferential direction C in the same manner as discussed above with reference to the receive coils 220.

Figure 8:
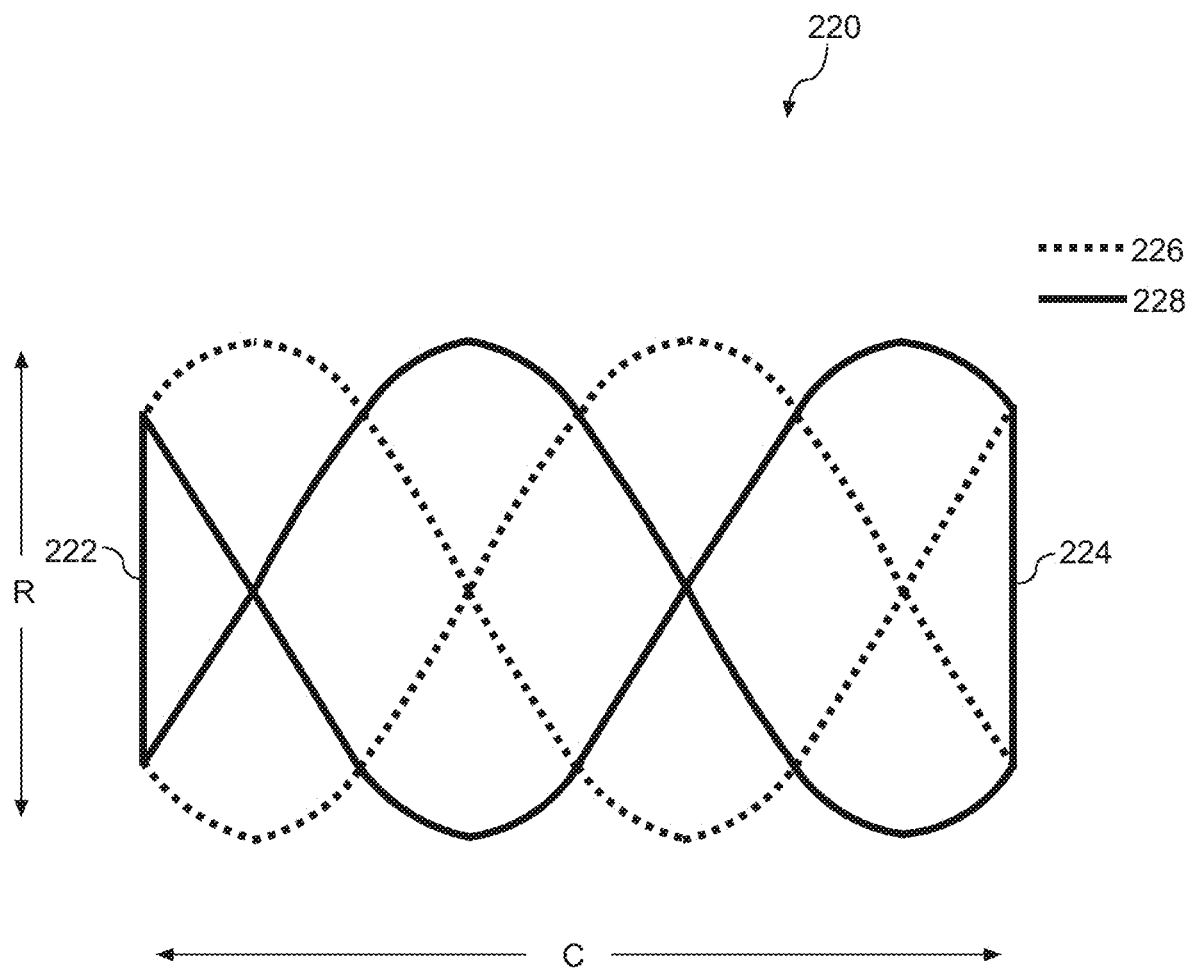
FIG. 8 depicts a first receive coil of a segment sensor element and a second receive coil of the segment sensor element according to example embodiments of the present disclosure.

Referring now to FIG. 8, a shape of the first receive coil 226 of the segment sensor element 200 can, in some implementations, correspond to a first sine wave. Furthermore, a shape of the second receive coil 228 of the segment sensor element 200 can correspond to a second sine wave that is phase shifted relative to the first sine wave by about 90 degrees. For instance, in some implementations, the second sine wave can be phase-shifted relative to the first sine wave by an amount ranging from 88 degrees to 92 degrees.

In some implementations, a phase angle of the first sine wave at an initial or zero position can range from about 35 degrees to about 55 degrees. Furthermore, in some implementations, the phase angle of the first sine wave at the zero position can be 45 degrees. In such implementations, the second sine wave can be a mirror image of the first sine wave. In addition, the impedance of the first receive coil 226 matches the impedance of the second receive coil 228. As will be discussed below, correction of an error signature associated with the output signal of each of the receive coils (e.g., first receive coil 226 and second receive coil 228) when the target 110 (FIG. 1) passes over the segment sensor element 200 and is titled relative to the segment sensor element 200 can be improved due, at least in part, to the shape of the first receive coil 226 (e.g., first sine wave) and the shape of the second receive coil 228 (e.g., second sine wave).

Figure 9:
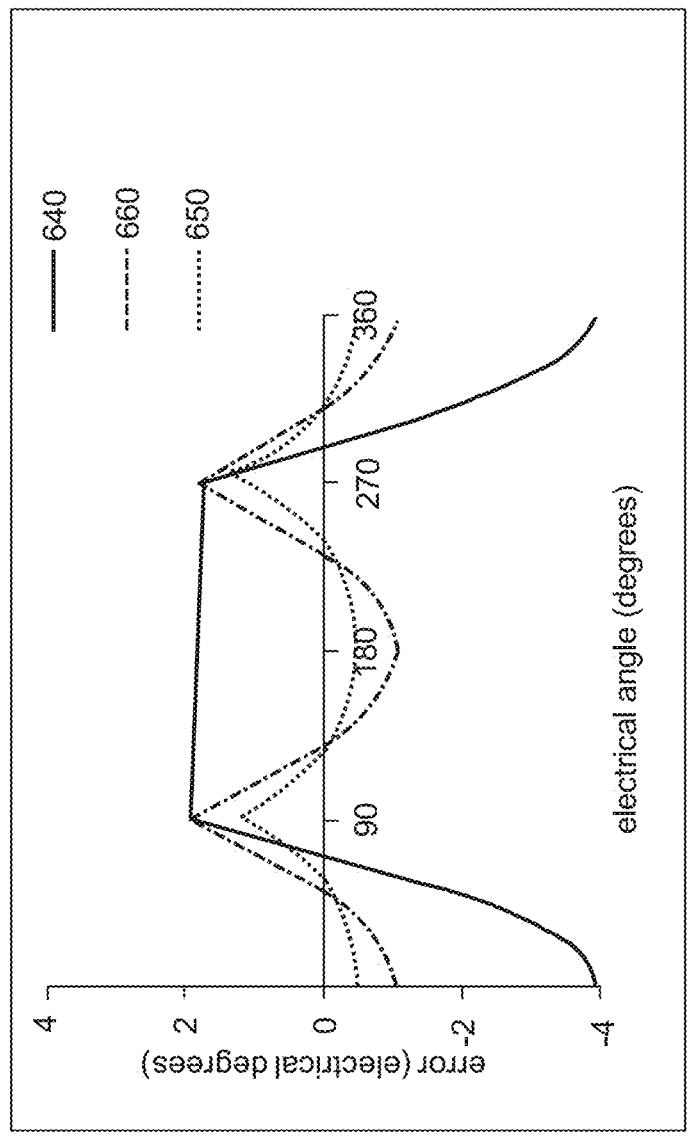
FIG. 9 depicts a graphical representation of an error signature associated with a target of a position sensor being tilted when passing over a segment sensor element of a position sensor according to example embodiments of the present disclosure.
Figure 10:
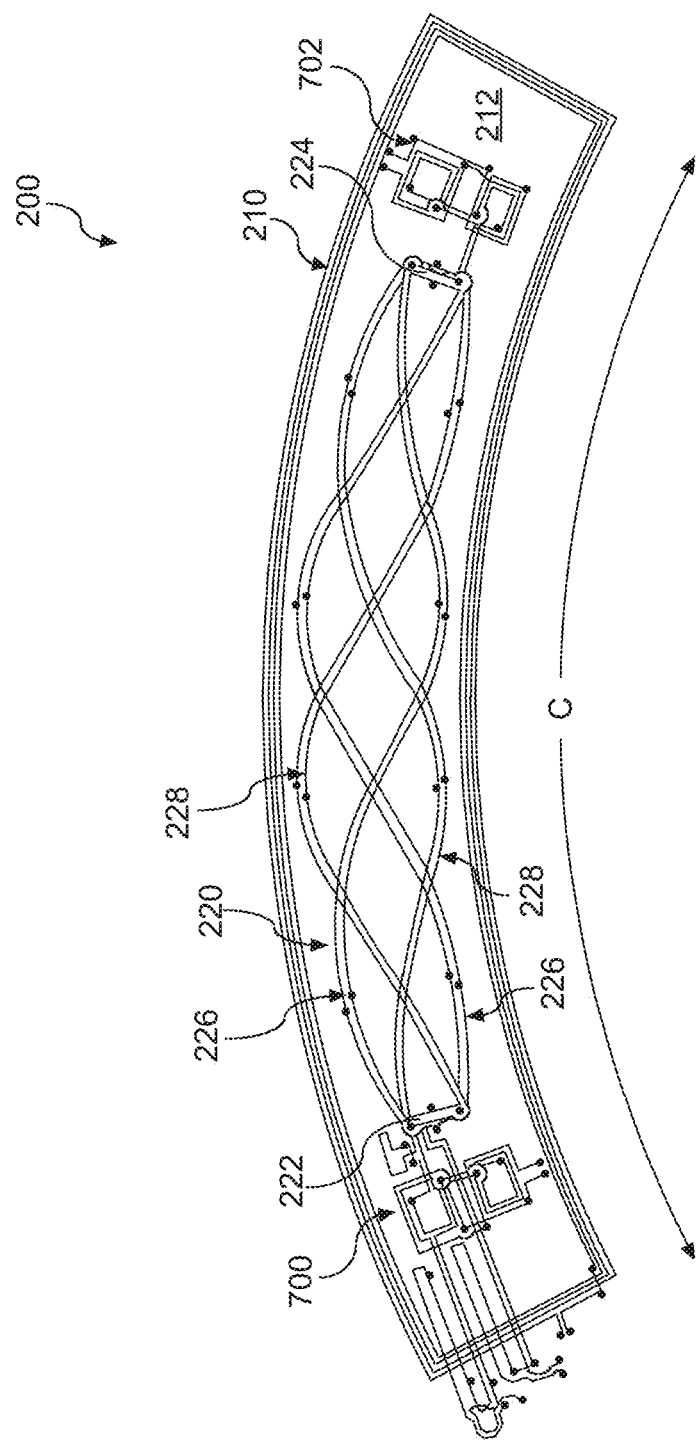
FIG. 10 depicts a schematic of another segment sensor element of a position sensor according to example embodiments of the present disclosure.
Figure 11:
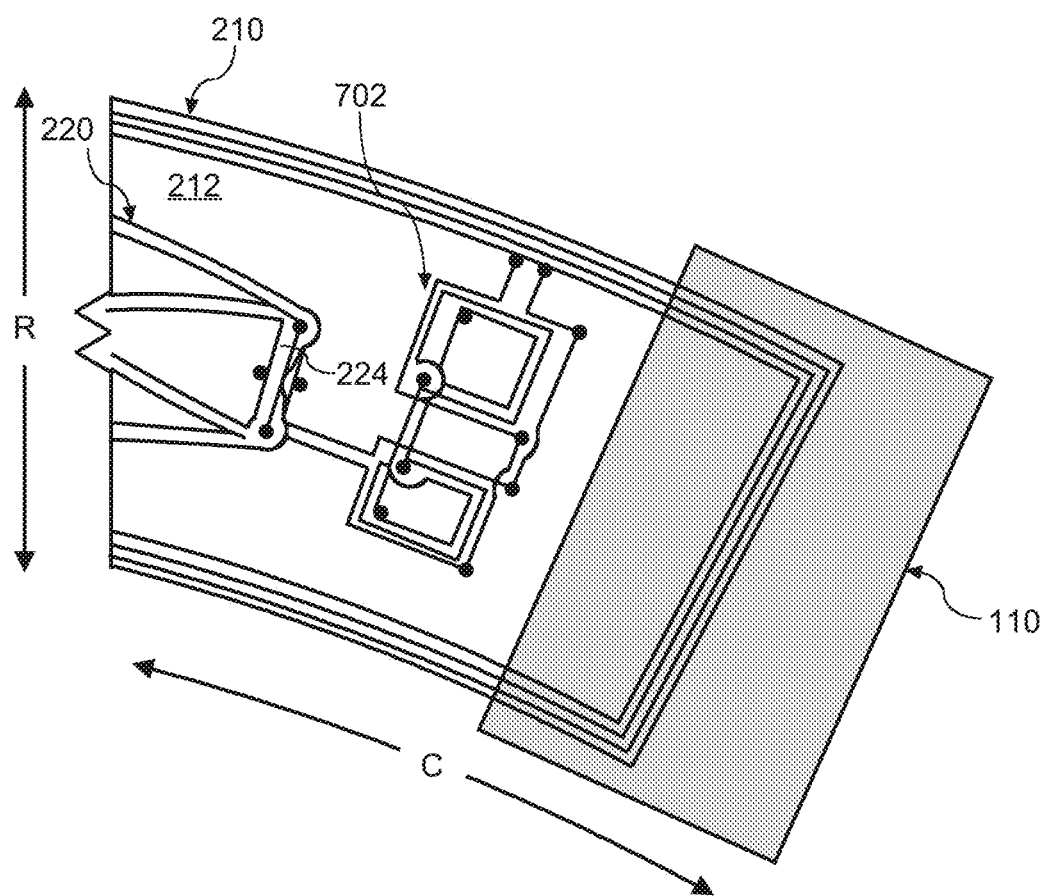
FIG. 11 depicts a portion of the breakthrough balancing structure of FIG. 10 according to example embodiments of the present disclosure.
Figure 12:
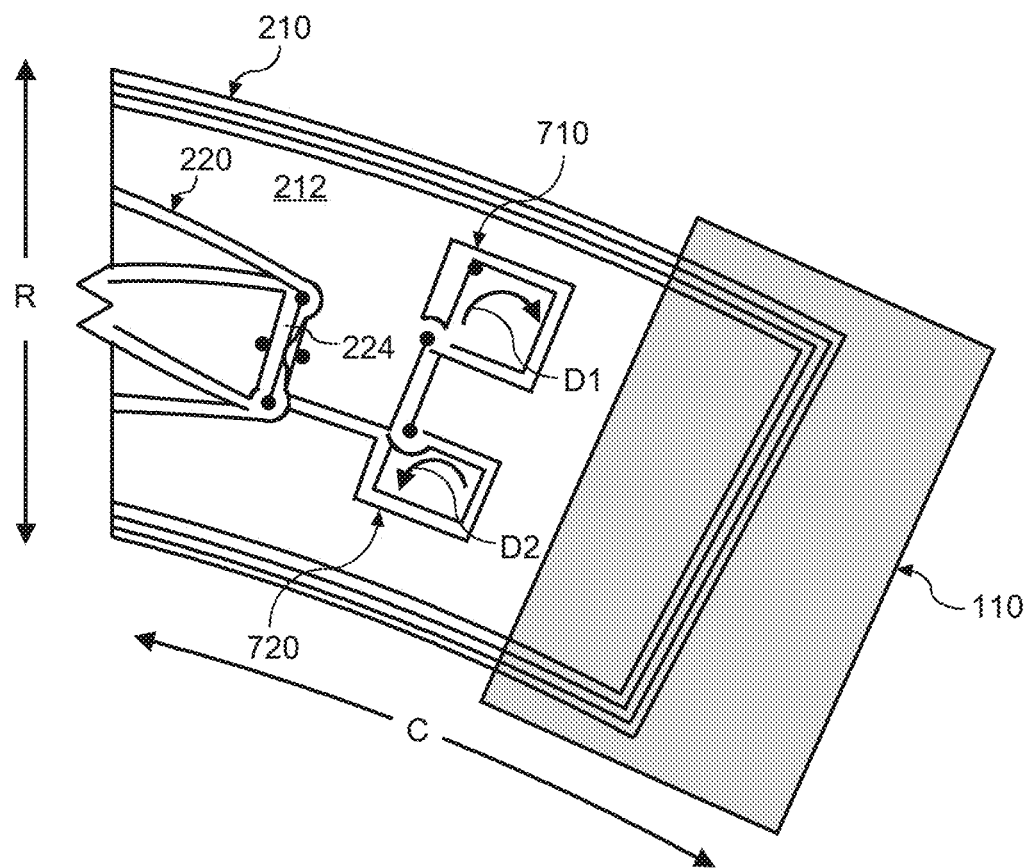
FIG. 12 depicts a portion of the breakthrough balancing structure of FIG. 10 according to example embodiments of the present disclosure.
Figure 13:
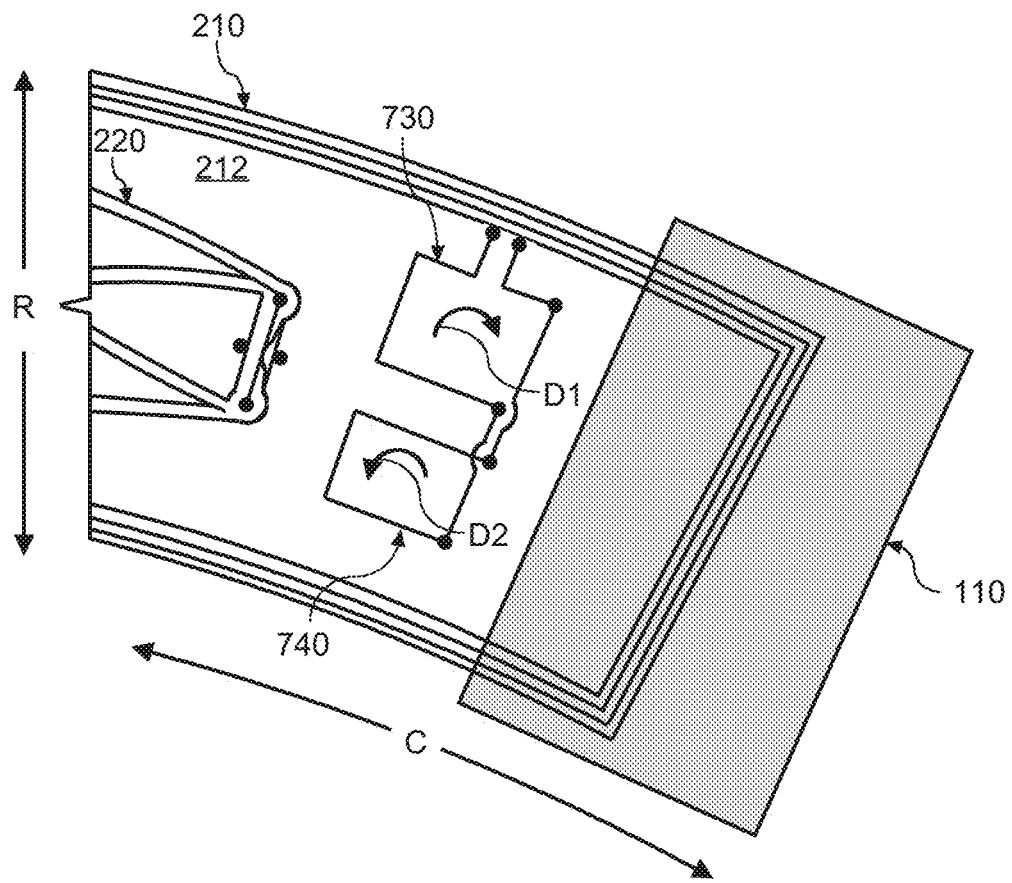
FIG. 13 depicts a portion of the breakthrough balancing structure of FIG. 10 according to example embodiments of the present disclosure.

Referring now to FIG. 9, a graphical representation of the error signature (denoted along the vertical axis in degrees) associated with the output signal of the receive coils (e.g., first receive coil 226 and second receive coil 228) as a function of an electrical angle (denoted along the horizontal axis in degrees) is provided according to example embodiments of the present disclosure. Curve 640 illustrates the error signature associated with the output signal of each of the receive coils when no signal processing algorithms (e.g., offset correction, amplitude correction) are implemented on the output signal. Curve 650 illustrates the error signature associated with the output signal of each of the receive coils when a signal processing algorithm associated with offset correction is implemented on the output signal. As may be seen, the error signature is reduced when the electrical angle ranges from about 90 degrees to about 270 degrees. Curve 660 illustrates the error signature associated with the output signal of each of the signals when signal processing algorithms associated with offset correction and amplitude correction are implemented on the output signal.

As shown, application of the signal processing algorithm associated with amplitude correction further reduces the error signature when the electrical angle ranges from about 90 degrees to about 270 degrees. In some implementations, an additional correction factor ranging from about 1.5 to about 2.0 can be achieved. More particularly, the additional correction factor can be about 1.7. It should be understood that this additional correctional factor is due, at least in part, to the first sine wave having a phase-shift of 45 degrees. Furthermore, the additional correction factor is due, at least in part, to the second sine wave being phase-shifted relative to the first sine wave by about 90 degrees.

Referring now to FIGS. 10-14, the segment sensor element 200 can, in some implementations, include a first breakthrough balancing structure 700 and a second breakthrough balancing structure 702. The first breakthrough balancing structure 700 can be positioned along the transmit coil 210 and the first end portion 222 of the plurality of receive coils 220. The second breakthrough balancing structure 702 can be positioned along the circumferential direction C between the transmit coil 210 and the second end portion 224 of the plurality of receive coils 220. It should be appreciated that the symmetry of the segment sensor element 200 can be improved due, at least in part, to the first breakthrough balancing structure 700 and the second breakthrough balancing structure 702 being spaced apart from one another along the circumferential direction C.

The first breakthrough balancing structure 700 and the second breakthrough balancing structure 702 can each include a first coil 710 and a second coil 720 that is spaced apart from the first coil 710 along the radial direction R. The first coil 710 and the second coil 720 can each be connected to the plurality of receive coils 220. Furthermore, the second coil 720 can be counter wound relative to the first coil 710. In this manner, electrical current flows in opposite directions in the first coil 710 and the second coil 720. For instance, an electrical current induced in the first coil 710 flows in a first direction D1 (e.g., clockwise). Conversely, electrical current induced in the second coil 720 flows in a second direction D2 (e.g., counterclockwise) that is opposite the first direction D1.

When the target 110 passes over the breakthrough balancing structure (e.g., first breakthrough balancing structure 700, second breakthrough balancing structure 702), the inductive coupling between the coils (e.g. first coil 710 and second coil 720) and the transmit coil 210 cancels out, resulting in no net coupling. Additionally, the arrangement of the first coil 710 and the second coil 720 relative to one another reduces coupling between the coils (e.g., first coil 710 and second coil 720) and the target 110. In this manner, error associated with the output signal of each of the plurality of receive coils 220 can be reduced and, as a result, error associated with the signal indicative of the position of the target 110 (FIG. 1) relative to the segment sensor element 200 can be reduced.

In some implementations, the breakthrough balancing structure (e.g., first breakthrough balancing structure 700 and second breakthrough balancing structure 702) can include a third coil 730 and a fourth coil 740 that is spaced apart from the third coil along the radial direction R. The third coil 730 and the fourth coil 740 can each be connected to the transmit coil 210. Furthermore, the fourth coil 740 can be counter wound relative to the third coil 730. In this manner, electrical current flows in opposite directions in the third coil 730 and the fourth coil 740. For instance, electrical current induced in the third coil 730 flows in the first direction D1 (e.g., clockwise). Conversely, electrical current induced in the fourth coil 740 flows in the second direction D2 (e.g., counterclockwise).

When the target 110 passes over the breakthrough balancing structure (e.g., first breakthrough balancing structure 700 or second breakthrough balancing structure 702), the inductive coupling between the coils (e.g. third coil 730 and fourth coil 740) of the breakthrough balancing structure and the plurality of receive coil 220 cancels out, resulting in no net coupling. Additionally, the arrangement of the third coil 730 and the fourth coil 740 relative to one another reduces coupling between the coils (e.g., third coil 730 and fourth coil 740) of the breakthrough balancing structure and the target 110. In this manner, error associated with the output signal of each of the plurality of receive coils 220 can be reduced.

Figure 14:
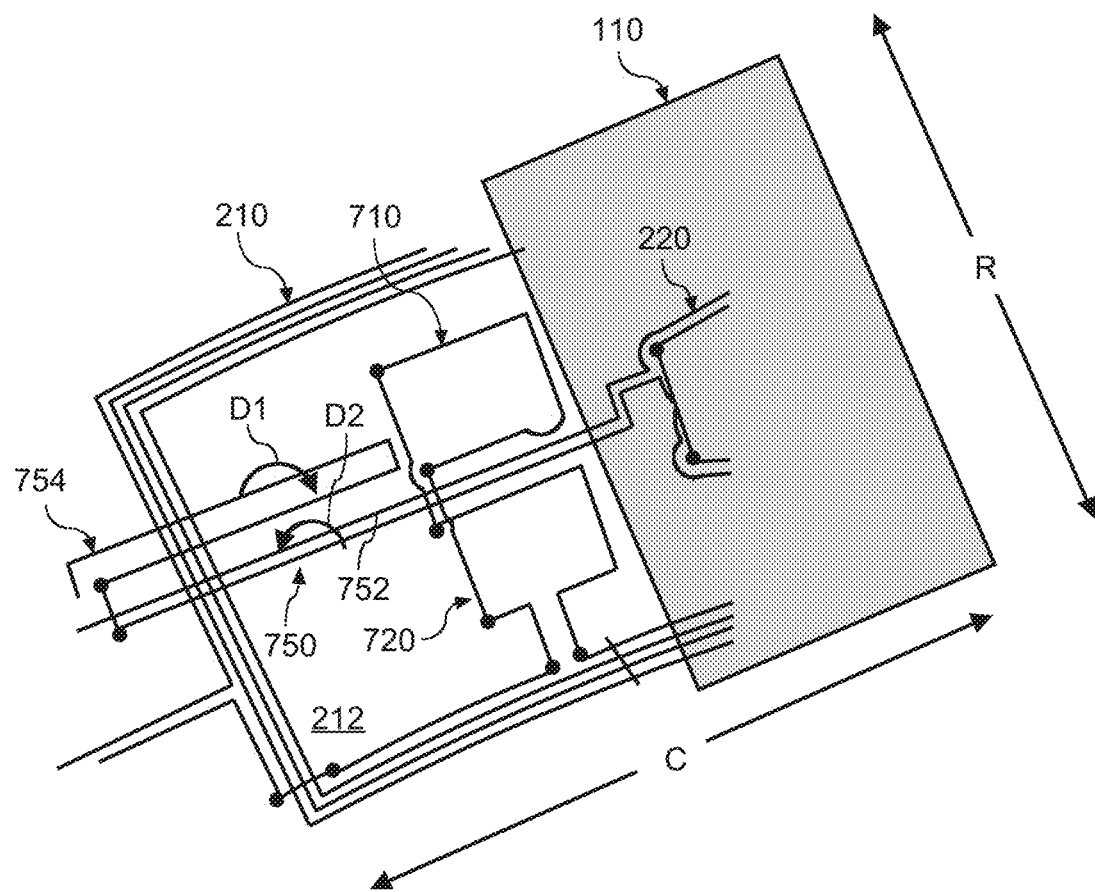
FIG. 14 depicts a connection structure for coupling receive coils of a segment sensor element to processing circuitry of a position sensor according to example embodiments of the present disclosure.

Referring now to FIG. 14, the segment sensor element 200 can be coupled to the processing circuitry 120 (FIG. 1) via a connection structure 750. As shown, the connection structure 750 can include one or more conductors 752 coupled to the plurality of receive coils 220. The connection structure 750 can further include a loop structure 754 that is spaced apart from the one or more conductors 752 along the radial direction R. In some implementations, the loop structure 754 can include a coil having a plurality of turns. In such implementations, the coil be would such that an electrical current induced in the coil flows in a direction that is opposite a direction in which an electrical current induced in the one or more conductors 752 flows. For instance, the electrical current induced in the coil can flow in a first direction D1 (e.g., clockwise). Conversely, the electrical current induced in the one or more conductors 752 can flow in a second direction D2 (e.g., counterclockwise) that is different than the first direction D1.

Furthermore, in some implementations, the one or more conductors 752 are positioned between the first coil 710 and the second coil 720 along the radial direction R to prevent the one or more connectors from coupling with the first coil 710 and the second coil 720. More specifically, since the second coil 720 is counter wound relative to the first coil 710, the coupling between the one or more conductors 752 and the second coil 720 would be equal and opposite the coupling between the one or more conductors 752 and the first coil 710. In this manner, placement of the one or more conductors 752 between the counter wound coils (e.g., first coil 710 and second coil 720) prevents inductive coupling between the one or more conductors 752 and the counter wound coils.

Figure 15:
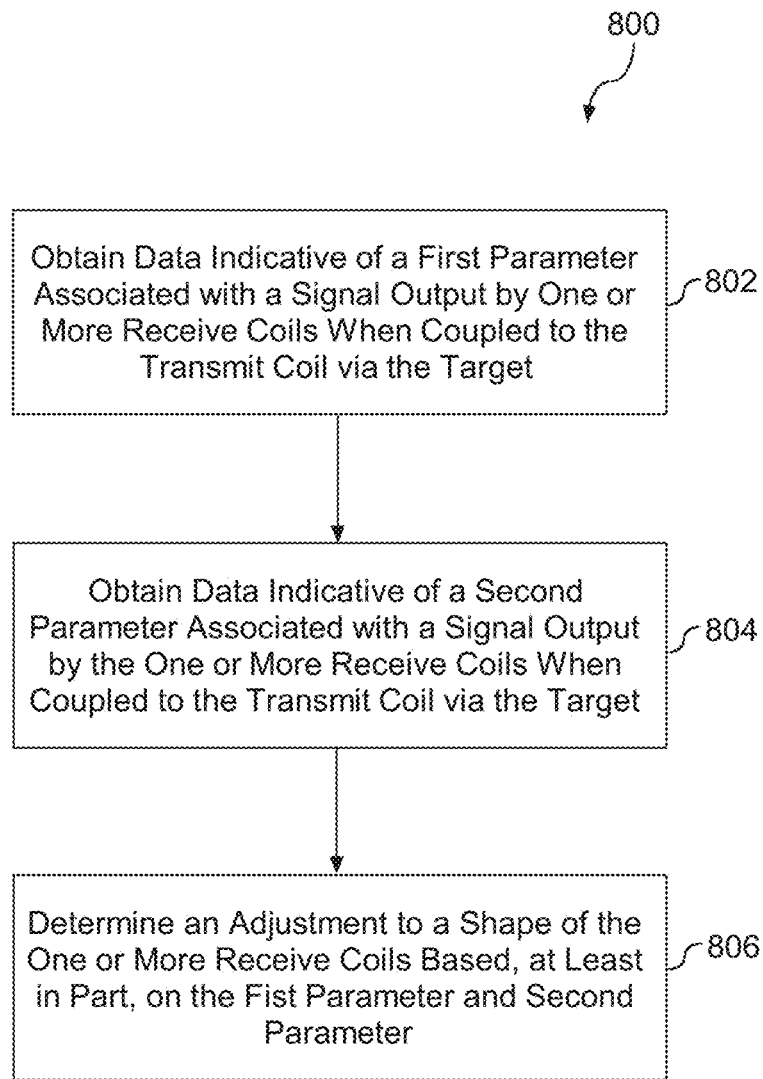
FIG. 15 depicts a flow diagram of a method for configuring a segment sensor element of a position sensor according to example embodiments of the present disclosure.

Referring briefly now to FIG. 15, a flow diagram of a method 800 for configuring a segment sensor element of a position sensor is provided according to example embodiments of the present disclosure. The method 800 may be implemented, using, for instance, one or more computing devices. Those of ordinary skill in the art, using the disclosures provided herein, will understand that various steps of the method 800 may be adapted, modified, rearranged, performed simultaneously or modified in various ways without deviating from the scope of the present disclosure.

At (802), the method 800 can include obtaining, by one or more computing devices, data indicative of a first parameter associated with a signal output by one or more of the plurality of receive coils of the segment sensor element when inductively coupled to the transmit coil via the target. In some implementations, the first parameter can be associated with signal levels (e.g., amplitude) of the signal.

At (804), the method 800 can include obtaining, by the one or more computing devices, data indicative of a second parameter associated with the signal output by the one or more receive coils of the segment sensor element when inductively coupled to the transmit coil via the target. The second parameter can be different than the first parameter. For instance, in some implementations, the second parameter can be indicative of a linearity error associated with the signal output by the one or more receive coils of the segment sensor element when inductively coupled to the transmit coil via the target.

At (806), the method 800 can include determining, by the one or more computing devices, an adjustment (e.g., distortion) to a shape of at least one of the receive coils along at least one of radial direction or the circumferential direction based, at least in part, on the data indicative of the first parameter and the data indicative of the second parameter.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A position sensor, comprising:
    a target; and
    a segment sensor element defining a circumferential direction and a radial direction, the segment sensor element comprising:
        a transmit coil;
        a plurality of receive coils positioned within a space defined by the transmit coil, the plurality of receive coils offset relative to one another;
        a first breakthrough balancing structure positioned within the space defined by the transmit coil such that the first breakthrough balancing structure is positioned along the circumferential direction between the transmit coil and a first end of the plurality of receive coils; and
        a second breakthrough balancing structure positioned within the space defined by the transmit coil such that the second breakthrough balancing structure is positioned along the circumferential direction between the transmit coil and a second end of the plurality of receive coils, the second end spaced apart from the first end along the circumferential direction,
    wherein the shape of each of the plurality of receive coils corresponds to a periodic waveform having a radial width that varies along the circumferential direction, and
    wherein the shape of at least one receive coil of the plurality of receive coils is distorted along at least one of the radial direction or the circumferential direction.

2. The position sensor of claim 1, wherein a radial width of the transmit coil is constant along circumferential direction.

3. The position sensor of claim 1, wherein the shape of the at least one receive coil is distorted along the radial direction such that the radial width at one or more locations on the at least one receive coil is reduced.

4. The position sensor of claim 3, wherein the one or more locations comprise a first end portion of the at least one receive coil and a second end portion of the at least one receive coil that is spaced apart from the first end portion along the circumferential direction.

5. The position sensor of claim 1, wherein the shape of the at least one receive coil is distorted along the radial direction such that the radial width at one or more locations on the at least one receive coil is increased relative to the radial width at the one or more locations on the at least one receive coil prior to being distorted along the radial direction.

6. The position sensor of claim 5, wherein the one or more locations comprise a location on the at least one receive coil that is positioned along the circumferential direction between a first end portion of the at least one receive coil and a second end portion of the at least one receive coil.

7. The position sensor of claim 1, wherein the shape of the at least one receive coil is distorted along the circumferential direction such that one or more portions of the at least receive coil are stretched or compressed along the circumferential direction.

8. The position sensor of claim 1, wherein the transmit coil is distorted along the radial direction such that a radial width of the transmit coil at one or more locations is reduced or increased.

9. The position sensor of claim 8, wherein the at least one receive coil is further distorted to introduce one or more harmonics.

10. The position sensor of claim 1, wherein the plurality of receive coils comprise a first receive coil, a second receive coil, and a third receive coil, and wherein the first receive coil, the second receive coil, and the third receive coil are offset relative to one another by about 120 degrees.

11. The position sensor of claim 1, wherein the plurality of receive coils comprise:
    a first receive coil having a shape corresponding to a first sine wave; and
    a second receive coil having a shape corresponding to a second sine wave that is phase-shifted relative to the first sine wave by about 90 degrees.

12. The position sensor of claim 11, wherein the second sine wave is phase-shifted relative to the first sine wave by an amount ranging from 88 degrees to 92 degrees.

13. The position sensor of claim 11, wherein a phase angle of the first sine wave at a zero position ranges from about 35 degrees to about 55 degrees.

14. The position sensor of claim 13, wherein the phase angle of the first sine wave at the zero position is 45 degrees.

15. The position sensor of claim 1, wherein the first breakthrough balancing structure and the second breakthrough balancing structure each comprise:
    a first coil connected to the plurality of receive coils; and
    a second coil connected to the plurality of receive coils, the second coil counter wound relative to the first coil and spaced apart from the first coil along the radial direction.

16. The position sensor of claim 15, wherein the first breakthrough balancing structure and the second breakthrough balancing structure each comprise:
- a third coil connected to the transmit coil; and
- a fourth coil connected to the transmit coil, the fourth coil counter wound relative to the third coil and spaced apart from the third coil along the radial direction.

17. A position sensor, comprising:
- a target; and
- a segment sensor element defining a circumferential direction and a radial direction, the segment sensor element comprising:
  - a transmit coil;
  - a plurality of receive coils positioned within a space defined by the transmit coil, the plurality of receive coils comprising:
    - a first receive coil having a shape corresponding to a first sine wave; and
    - a second receive coil having a shape corresponding to a second sine wave that is phase-shifted relative to the first sine wave by about 90 degrees, wherein the shape of the first sine wave or the second sine wave is distorted along at least one of the radial direction or the circumferential direction;
  - a first breakthrough balancing structure positioned within the space defined by the transmit coil such that the first breakthrough balancing structure is positioned along the circumferential direction between the transmit coil and a first end of the plurality of receive coils; and
  - a second breakthrough balancing structure positioned within the space defined by the transmit coil such that the second breakthrough balancing structure is positioned along the circumferential direction between the transmit coil and a second end of the plurality of receive coils, the second end spaced apart from the first end along the circumferential direction.

18. The position sensor of claim 17, wherein the shape of the first sine wave and the second sine wave is distorted along at least one of the radial direction or the circumferential direction.

* * * * *